United States Patent
Haprian et al.

(10) Patent No.: US 10,942,970 B2
(45) Date of Patent: Mar. 9, 2021

(54) REACHABILITY GRAPH INDEX FOR QUERY PROCESSING

(71) Applicant: Oracle International Corporation, Redwood Shores, CA (US)

(72) Inventors: Vlad Haprian, Zurich (CH); Oskar Van Rest, Mountain View, CA (US); Sungpack Hong, Palo Alto, CA (US); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 275 days.

(21) Appl. No.: 16/159,384

(22) Filed: Oct. 12, 2018

(65) Prior Publication Data

US 2020/0117762 A1    Apr. 16, 2020

(51) Int. Cl.
*G06F 7/00* (2006.01)
*G06F 16/00* (2019.01)
(Continued)

(52) U.S. Cl.
CPC .... *G06F 16/9024* (2019.01); *G06F 16/90335* (2019.01)

(58) Field of Classification Search
None
See application file for complete search history.

(56) References Cited

U.S. PATENT DOCUMENTS

2014/0172914 A1* 6/2014 Elnikety ............. G06F 16/9024
707/774

2015/0019592 A1* 1/2015 Jin .......................... G06F 17/10
707/798
(Continued)

OTHER PUBLICATIONS

Xuming, Meng, "Efficient Regular Path Query Evaluation in PGX", Eindhoven University of Technology, Master's Thesis, dated Jul. 31, 2016. 69 pages.
(Continued)

*Primary Examiner* — Tuan A Pham
(74) *Attorney, Agent, or Firm* — Hickman Palermo Becker Bingham LLP

(57) ABSTRACT

Techniques are described for generating and re-using reachability graphs for efficient execution of queries. In an embodiment, a query is received for execution on a data graph. Such a query may include one or more expressions for edges in the data graph, which when executed select one or more paths in the data graph to generate results for the query. The system uses a repository to store reachability graphs and may determine whether a reachability graph for an expression of the query for the data graph is stored in a repository. Such a reachability graph is generated by applying the expression on the data graph to qualify or disqualify the edges in the data graph to be included as part of edges of the reachability graph. For example, an edge in a reachability graph exists between two vertices when at least one edge of the data graph has qualified between two vertices of the data graph that correspond to the two vertices of the reachability graph. Based on determining that the reachability graph for the expression is stored in the repository, the system executes the query on the reachability graph without re-applying the expression on the data graph and generates the results for the query.

26 Claims, 5 Drawing Sheets

(51) Int. Cl.
*G06F 16/901* (2019.01)
*G06F 16/903* (2019.01)

(56) References Cited

U.S. PATENT DOCUMENTS

| | | | |
|---|---|---|---|
| 2015/0081739 A1* | 3/2015 | Xu | G06F 16/9024 707/792 |
| 2015/0112986 A1* | 4/2015 | Jin | G06F 16/9024 707/736 |
| 2015/0222604 A1* | 8/2015 | Ylonen | H04L 63/10 713/171 |
| 2015/0347625 A1* | 12/2015 | Werneck | G06F 16/24569 707/798 |
| 2017/0011099 A1* | 1/2017 | Paradies | G06F 16/248 |
| 2017/0046387 A1* | 2/2017 | Cheng | G06F 16/9024 |
| 2018/0268079 A1* | 9/2018 | Das | G06F 17/18 |

OTHER PUBLICATIONS

Wood, Peter, "Query Languages for Graph Databases", Sigmod Record, Mar. 2012 (vol. 41, No. 1), 11 pages.

Veloso et al., "Reachability Queries in Very Large Graphs: A Fast Refined Online Search Approach", Published in Proc. 17th International Conference on Extending Database Technology, 2014, 12 pgs.

Koschmieder et al., "Regular Path Queries on Large Graphs", dated 2012, 11 pages.

Fletcher et al., "Efficient Regular Path Query Evaluation Using Path Indexes", Published in Proc. 19th International Conference on Extending Database Technology, dated 2016, 4 pages.

Boria et al., "A Greedy Approach to Answer Reachability Queries on DAGs", Discrete Mathematics and Theoretical Computer Science, dated Nov. 8, 2016, 24 pages.

\* cited by examiner

US 10,942,970 B2

REACHABILITY GRAPH INDEX FOR QUERY PROCESSING

FIELD OF THE TECHNOLOGY

The present invention relates to the field of electronic database management, in particular to reachability graph-based query processing.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The amount of data available for processing has been increasing exponentially. When such data is recorded, critical information is often captured not only in data entries themselves but in the relationships between the data entries. One methodology to fully represent the various relationships between data entries is to arrange the data entries in a graph arrangement. In such an arrangement, each vertex/node represents a data entry interconnected by edges with other data entries through their corresponding vertices. Accordingly, in a graph, an edge represents a relationship of the data entry with another data entry.

Graph query engines aim to exploit such relationships by providing a fast and scalable way of executing graph queries on the data. To query a graph-based arrangement of data, reachability path queries are often used to determine whether a relationship exists between data entries. A reachability query indicates the data values for the data entries and expression of the desired relatedness. Reachability queries check for the existence of paths between pairs of vertices such that the path satisfies the expression that indicates the desired relationship.

In order to execute reachability queries, various methodologies of graph traversals are used. The methodologies include starting at one of the vertices and traversing to other vertices using techniques unique to the methodology. While traversing through an edge, the edge-related data of the edge is compared with the expression indicated for the relationship in the query. Based on applying the expression, the edge is qualified or disqualified for further traversal.

Regardless of the methodologies used, in a graph with millions of vertices such a traversal is quite computationally expensive. For example, both breadth-first search (BFS) and depth-first search (DFS) are recursive methodologies and perform repetitive exhaustive exploration of the graph to determine the result of the query. For big data, with highly-interconnected vertices, this may yield a multiple order greater number of traversals than the number of vertices.

The problem is further exacerbated when the query specifies predicates for the start and/or end vertices. Thus, a single query may specify multiple start vertices and/or multiple end vertices. In such a scenario, the consumption of computing resources for the traversal of the graph are many times greater because the graph may need to be traversed multiple times depending on the number of starting vertices selected by the query.

BRIEF DESCRIPTION OF THE DRAWINGS

In the drawings of certain embodiments in which like reference numerals refer to corresponding parts throughout the figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe generation and efficient application of a "reachability graph index" for executing "reachability path queries" on a graph-based data arrangement. In a graph-based data arrangement (simply "data graph" or "graph"), an edge may only be associated with a label, such as in a Resource Description Framework (RDF) graph. Additionally or alternatively, an edge may have an arbitrary number of attributes, such as in a Property Graph (PG). Accordingly, multiple relationships between two data entries may be represented by a single edge with multiple attributes or by multiple edges with different labels between the corresponding vertices. Although examples herein use label-based edges, the same techniques apply to attribute-based edges.

Figure 1A:
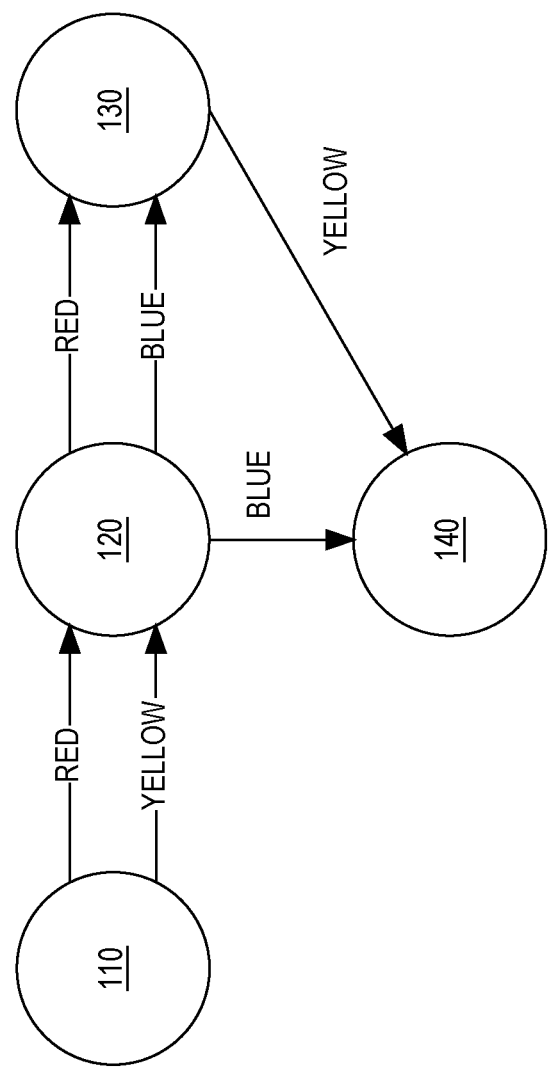
FIG. 1A is a diagram that depicts a data graph with color-labeled attribute edges, in an embodiment.

FIG. 1A is a diagram that depicts data graph 100 with color-labeled edges, in an embodiment. Data graph 100 includes data entries represented by vertices 110-140. Vertex 120 has a parent relationship with vertex 130 connected through RED and BLUE label edges. Same vertex 120 has a child relationship with vertex 110 connected through RED and YELLOW label edges. Vertex 140 has a parent relationship with both vertices 120 and 140 with BLUE and YELLOW label edges respectively.

Reachability Query Overview

In an embodiment, a "reachability path query" is received to be executed on a data graph, such as data graph 100 of FIG. 1A. The "reachability path query" (or simply, "reachability query") term refers herein to a query that returns a path or an indication of the existence of the path that satisfies one or more conditions specified for edges in a data graph. The one or more conditions may be specified as matching expressions (e.g., path expressions, regular expressions) for label(s) and/or attribute(s) of edges. The path returned if any may be the shortest path between the vertices that qualifies.

For example, a sample reachability query for a path existence between data entry "x" and data entry "y" may be specified as "(x)-[YELLOW/(RED|BLUE)*]→(y)"—an existence of an edge that satisfies "YELLOW/(RED|BLUE)*" expression, and starts at vertex "(x)" and ends at vertex "(y)".

In an embodiment, a reachability query may include an "unbounded quantifier path expression" for edges. The "unbounded quantifier path expression" (or simply "unbounded expression") term refers to an expression in a condition of a query that does not provide a bound for the depth of the qualifying path. For example, the condition "YELLOW/(RED|BLUE)*" of the above sample reachability query includes an unbounded expression of "(RED|BLUE)*". The condition requires an edge with label "YELLOW" to be followed with zero or an unbounded number of "RED" or "BLUE" label edges.

For example, the above reachability query may be executed on data graph 100 of FIG. 1A. As part of the query execution, each edge of data graph 100 between each pair of vertices has to be evaluated. Vertex 110 and 120 are connected with two edges, the RED edge is disqualified by the query, but the YELLOW edge is qualified. Because of the (RED|BLUE)* expression in the query, the evaluation has to proceed recursively. The recursive evaluation ensures that all paths are considered. Each sub-tree of nodes connected to vertex 120 have to be exhaustively evaluated, and thus recursively traversed in order to return the complete set of paths that qualify the (RED|BLUE)* unbounded expression. Doing so yields that vertex 110/vertex 120/vertex 130 and vertex 110/vertex 120/vertex 140 paths also qualify.

In an embodiment, a data entry of a data graph for a vertex or for an edge may include multiple attributes. A reachability query may further indicate predicates for the start vertex data entry and/or for the end vertex data entry. Additionally or alternatively, a reachability query may include predicates for edge data entry attribute(s). Based on such predicates, vertices and paths may be disqualified during the traversal(s) of the data graph.

Reachability Graph Index Overview

In an embodiment, a "reachability graph index" is generated from a data graph based on an edge expression of one or more queries. The "reachability graph index" (or simply "reachability graph") term refers herein to a replica of data graph modified to remove the edges (and vertices that become orphan as a result of the removal of edges) that fail to qualify based on a particular query expression.

In an embodiment, to generate a reachability graph for a reachability query expression, a data graph is traversed. An edge is inserted in a reachability graph between two vertices, based on whether at least one edge, between the same two vertices in the data graph, qualifies according to the reachability query expression. After completing the traversal of the data graph, a reachability graph is generated with at most one edge between originally connected vertices based on whether the corresponding original edges qualified according to the expression.

Using a reachability graph for a particular query expression, the traversal of the data graph is improved by avoiding a separate evaluation of each path from a given vertex for the particular query expression. When the query containing the particular expression is executed on the reachability graph rather than the full data graph, the full expression is no longer evaluated for each edge in the data graph. If an edge exists, then the path qualifies for the particular expression, and only other conditions in the query are to be evaluated for the traversal of the path. Therefore, using a reachability graph significantly improves the query execution by significantly lowering the evaluations (especially, nested evaluations in complex expressions) that are necessary to perform when traversing the actual data graph from one vertex to another.

Figure 1B:
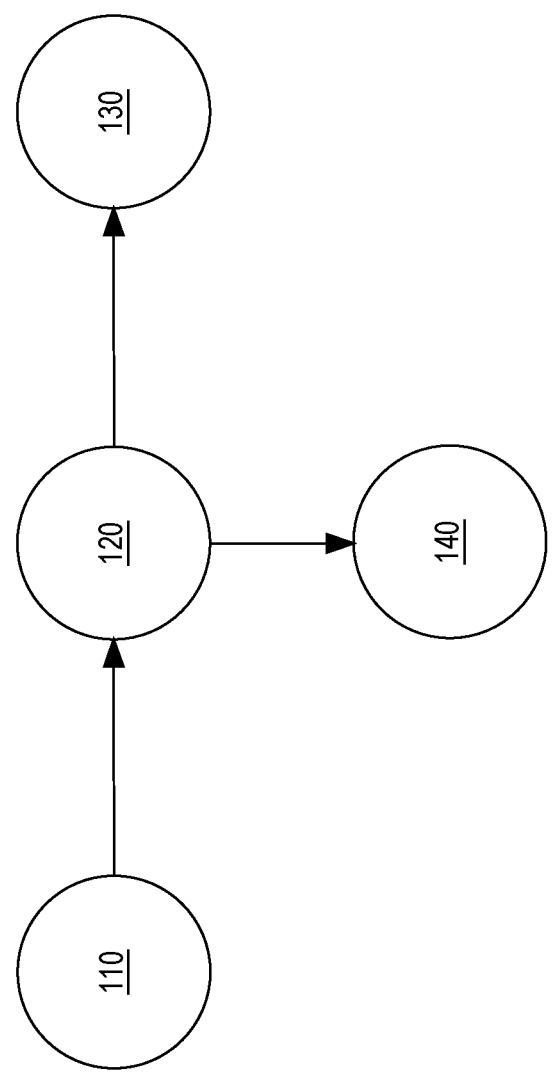
FIG. 1B is a diagram that depicts a reachability graph for a data graph for an expression, in an embodiment.

For example, FIG. 1B is a diagram that depicts reachability graph 150 for data graph 100 of FIG. 1A for an expression that selects only RED or BLUE labeled edges such as "(RED|BLUE)*", in one or more embodiments. When executing a query with the same expression on data graph 100, every edge has to be evaluated. Meanwhile, when executing the same query with the same expression on corresponding reachability graph 150, no evaluation is necessary on the edges for the expression. Reachability graph 150 is traversed to evaluate only condition(s) other than the expression. Furthermore, the traversal is reduced because of the disqualified edges are removed in reachability graph 150, for example, vertex 130 has no outgoing edge and traversal of the path that reaches vertex 130 may stop there. Thus, the query's performance is improved by skipping evaluation of edges for the expression and in some cases, reducing traversal for evaluating the query (and thus, eliminating any further evaluation to be performed once traversed).

In order to further improve the performance of reachability queries, a generated reachability graph is stored in a repository of reachability graphs, in an embodiment. When a new query is received, a system determines whether a reachability graph that is the same or compatible with a new query's expression exists in the repository. If so, then the existing reachability graph is retrieved from the repository and used to execute the new reachability query. By re-using an already generated graph, the system improves the performance of a reachability query and saves considerable computational resources in generating a reachability graph or in using other resource-heavy techniques to traverse through the full data graph.

In some examples, a reachability query may contain multiple expressions, each of these expressions may be matched to an existing reachability graph in the repository. Accordingly, multiple reachability graphs may be used in an execution of a reachability query.

In one embodiment, reachability graphs are generated and stored only for a particular class of expressions. The class of expressions is selected based on the heavy use of computing resources that the expressions of the class generally require for evaluation.

For example, since unbounded expressions are particularly resource intensive for traversal in data graphs, a system may select to generate reachability graphs only for unbounded expressions and store those in the repository. When a query is received, the query is parsed to determine whether it contains one or more unbounded expressions. The system determines whether one or more reachability graphs are stored in the repository for the specified unbounded expressions. If so, the system executes the query using the reachability graphs. Otherwise, the system attempts to generate one if the system contains enough memory space.

The techniques described herein also provide for the efficient storing, lookup and memory management of a reachability graph repository. For a graph repository stored in volatile memory, memory limitations may constrain the number of reachability graphs that the repository may maintain. Thus, before generating a graph, in one embodiment, the system estimates the size of the future reachability graph based on data statistics of the data graph and the expression for which the reachability graph is to be generated. If the estimated size of the reachability graph exceeds a memory threshold for the system to store the graph in the volatile memory and perform a traversal of the graph, then the reachability graph is not generated, rather techniques are used that do not use a reachability graph for traversal.

Further techniques are described herein for maximizing the usage of the reachability graphs in a memory constraint environment. For example, concurrently executed reachability queries that contain the same expression may initiate a single reachability graph to be generated and used by both queries, thus, avoiding regeneration of the reachability graph due to concurrency. As another example, stored reachability graphs may be arranged based on their respective usage statistics, and one or more reachability graphs that have not been used may be removed from the volatile memory.

Reachability Graph Repository

In an embodiment, a system maintains a reachability graph repository in which one or more reachability graphs are stored along with the corresponding metadata about the reachability graphs. The repository may reside in low latency/high bandwidth memory, such as volatile memory or fast-access non-volatile memory. Non-limiting examples of such memory include processor cache memory, system memory, flash memory, and solid-state drive memory.

In an embodiment, the repository is organized in a logical structure that stores reachability graph metadata in association with the corresponding reachability graph. The reachability graph metadata contains information that describes the reachability graph. Such reachability graph-related description may include information on the source data graph for which the reachability graph is generated, reachability graph expression for which the graph is generated, timestamp of the generation, indicator whether any changes have been made to the data graph since the generation of the reachability graph and status data for the reachability graph.

The metadata may further store access statistics and status data. Non-limiting examples of access statistics for a reachability graph are the number of accesses during one or more pre-defined periods, the latest access order in the repository from the last access to the earliest accessed, and timestamp of the last access.

Non-limiting examples of status data for a reachability graph is an indication whether the graph is currently being accessed, an indication whether the graph is currently being generated, and an indication that the graph is marked for deletion or archive.

Querying With Reachability Graph

Figure 2:
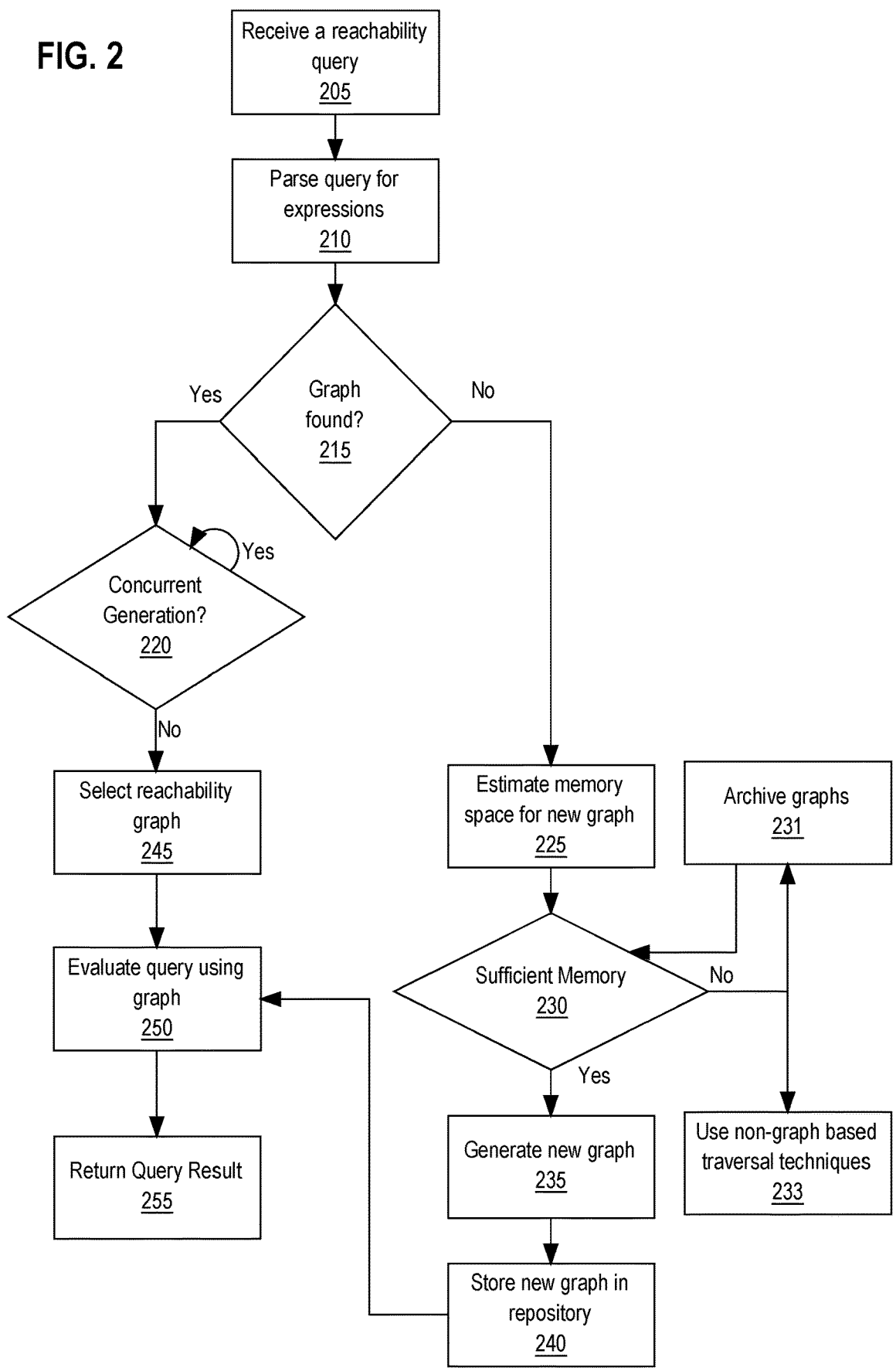
FIG. 2 is a flow diagram that depicts a process for evaluating a reachability query using a reachability graph, in an embodiment.

FIG. 2 is a flow diagram that depicts a process for evaluating a reachability query using a reachability graph, in an embodiment. At step 205, a reachability query is received by the evaluating system. At step 210, the query is parsed to identify a data graph and expressions to be evaluated on the data graph. Expressions are identified based on one or more criteria defined for a reachability graph repository. If the query expression matches the criteria, then the expression is used to look up into the repository for the corresponding reachability graph.

For example, the system may store reachability graphs only for unbounded expressions of edge traversal. In such an example, while parsing the reachability query, unbounded expressions are identified. The identified expression(s) are looked up in the repository to determine whether any corresponding reachability graph(s) have been previously generated and stored in association with the unbounded expression(s).

Thus, continuing with FIG. 2, at step 215, the qualified expression of the query and the referenced data graph of the query are looked up in the repository to determine if a corresponding reachability graph exists. Since the repository stores metadata of reachability graphs that may include source data graph and query expression, the metadata is compared with the expression and referenced data graph to determine whether the reachability graph for the query expression on the referenced data graph is (or will be) stored in the repository.

If at step 215, the expression(s) are matched to metadata, then the process proceeds to step 220. Otherwise, the process proceeds to step 225 to possibly generate a new reachability graph for the query referenced data graph.

Estimating Memory Requirements For Storing Reachability Graph

A reachability graph, although only partially representing a data graph, may require significant memory space to store in a repository. A data graph may contain millions of nodes and edges, and even if a reachability graph contains only a portion of the data graph, the reachability graph may still include a significant number of nodes and edges. Additionally, a repository of reachability graphs may be stored in a faster-access memory, such as volatile memory. Such memory may have much less space than non-volatile disk memory, as an example. The lack of memory space further constrains the number of reachability graphs that can be stored in the repository.

Accordingly, in an embodiment, continuing with FIG. 2, at step 225, before generating a new reachability graph, the memory space for the graph is estimated. The system estimates the new reachability graph's memory requirements based on the data statistics of the data graph. The term "data statistics" refers herein to numerical representations for quantifying the data distribution and storage characteristics of the data stored in a data graph. In an embodiment, data statistics are collected for any granularity data portions.

Non-limiting examples of data statistics include: number of vertices/edges in a data graph, number of attributes per vertex/edge, average size of attributes, number of distinct values (NDV) for an attribute of an edge/vertex, number of nulls for an attribute of an edge/vertex, histogram statistics for attribute values of an edge/vertex and other data statistics that may include any combination of the above statistics or an application of one or more statistical functions such as a minimum, maximum, average, median and standard deviation thereon.

In an embodiment, to determine the memory space estimate of a reachability graph for an expression, the system determines an estimate for the number of edges that would qualify for the expression. In case the expression contains multiple sub-expressions, each sub-expression may be evaluated, and the results are statistically combined to yield the estimate for the expression. One approach to statistically combine (sub-)expressions is to parse them until a condition contains only a single predicate for an edge attribute. From data statistics, the selectivity probability of an edge qualifying for the predicate based on an attribute value is selected. Alternatively, the selectivity probability may be determined by selecting a number of edges for attribute value from statistics and calculating the selectivity probability by dividing the number by the total number of edges in the data graph.

In an embodiment in which a (sub-)expression is a basic expression that contains a value-based predicate for an attribute, histogram statistics for that attribute is used. Histogram statistics for an edge attribute are generated by arranging the values for the attribute and then bucketing the values based on the values themselves or on a number of values in each bucket. Accordingly, each bucket in histogram statistics for an attribute is associated with a distinct value range of the attribute and indicates the number of attribute values in that value range. Based on histogram statistics, a number of edges with a particular attribute value or value range; or popular (frequent) and non-popular (non-frequent) values and value ranges for an attribute may be determined and tracked as part of the data statistics. The histogram statistics' bucket(s) are selected based on the predicate value in the expression. The selectivity probability for any value or value range of an attribute may be calculated based on the histogram statistics bucket(s) of the attribute for the value-based condition specified in the (sub-)expression.

With selectivity probabilities determined for basic sub-expressions (such as a predicate on an edge attribute), the selectivity probabilities of disjunctive sub-expressions are compared, and the maximum is retained. The selectivity probabilities of conjunctive conditions are multiplied together.

For example, if sub-expressions are combined by an AND operator, then the probabilities of the sub-expressions are multiplied together to yield the cumulative probability for the combination of the sub-expressions. On the other hand, if, for example, the sub-expressions are combined by an OR operator, then the maximum of their respective selectivity probabilities is selected as the cumulative probability for the combination of the sub-expressions.

Using these techniques, the selectivity probability for the expression containing the sub-expressions is calculated and based on the selectivity probability for the expression, the estimate memory size for the reachability graph for the expression is determined. In one embodiment, the reachability graph's memory size is estimated based on the target data graph's size and the selectivity probability.

For example, estimating a size for a reachability graph constructed for expression "[(color=RED OR color=BLUE) AND weight>10]" which selects any edge that has "color" attribute with the value of "RED" or "BLUE" as well as has "weight" attribute with a value that exceeds 10. Data statistics of the target data graph may indicate that the data graph contains close to 100 edges. The histogram statistics for the "color" attribute may indicate 40 "RED" attribute values and 50 "BLUE" values. Accordingly, the selectivity probability of the "RED"-value color edge attribute is 40/100=0.4 while the BLUE-value edge attribute's selectivity is similarly calculated to be 0.5. The histogram statistics for weight attribute may indicate that the buckets associated with the "weight" attribute value greater than 10 have 15, 15 and 20 number of edges. Accordingly, the system calculates that edges, with the weight attribute value greater than 10, have selectivity probability of (15+15+20)/100=0.5. Since "BLUE" and "RED" edge attribute value sub-expressions are disjunctively combined in the sub-expression, their respective selectivity probabilities are compared, and the maximum of 0.5 is selected for the combined sub-expression. The combined sub-expression is conjunctively combined with the "weight" edge attribute value sub-expression. Thus the corresponding selectivity probabilities are multiplied to yield 0.5*0.5=0.25 selectivity probability for the expression. The reachability graph's estimated size is calculated by multiplying the selectivity probability for the expression of the reachability graph with the size of the target data graph.

Memory Management

Continuing with FIG. 2, at step 230, based on the calculated size estimate for a new reachability graph, the system determines whether sufficient memory for the new reachability graph can be allocated in fast-access memory, in an embodiment. If it is determined that no allocation can be made due to limited available fast-access memory resources, then, in one embodiment, the process moves to step 231.

At step 231, the system determines whether any of the existing reachability graphs stored in the fast-access memory can be removed from the fast-access memory. According to one embodiment, the system selects access statistics and status data about the reachability graphs stored in the fast-access memory repository. If the status data and/or access statistics indicate that a reachability graph is eligible for removal, the identified reachability graph is removed. In some embodiments, rather than deleting the reachability graph, the reachability graph is copied to a repository in slower-access memory.

The eligibility for removal may be determined if any one or more of the following indications are identified for a reachability graph in fast-access memory: a) the status data indicate that the reachability graph is not currently in-use for traversal (is idle), b) the access statistics of the reachability graph indicate that a reachability graph has been less frequently accessed than any other reachability graph, and/or c) the access statistics indicate that the reachability graph has been last accessed prior to any other idle reachability graph.

In another embodiment, the determination about the eligibility for removal of a graph is performed asynchronously from the determination for sufficient fast-access memory resources. The system may periodically perform step 231 asynchronous from the request to execute a reachability query for which a reachability graph is to be obtained. The one or more reachability graphs identified for removal may have their respective status data modified to indicate eligibility for removal from the fast-access memory.

In such an embodiment, if, at step 230, the available fast-access memory is determined to be insufficient to generate a reachability graph, status data of stored reachability graphs in fast-access memory is used to determine which reachability graph(s) may be removed from the fast-access memory. The reachability graphs whose metadata indicates so, are either archived to slower-access memory or erased from the repository.

After one or more reachability graph removals from the fast-access memory at step 231, the amount of available fast-access memory is re-checked at step 230. If the fast-access memory space continues to be unavailable, the process proceeds to step 231 to attempt to identify other reachability graph(s) for removal. If no further reachability graph is identified as eligible for removal at step 231, and fast-access memory continues to be unavailable, then the process proceeds to step 233. At step 233, non-graph based techniques are used to execute the graph bases selection, in an embodiment.

Generating Reachability Graph

At step 235, the system may generate a reachability graph of the expression for the target data graph based on the determination at step 230 that the requisite amount of fast-access memory is available to store the reachability graph. According to one embodiment, before initiating the generation of the reachability graph, the system stores in the repository a corresponding entry that indicates that the generation of the reachability graph is in progress. The entry may contain information on the reachability such as the expression for which it is generated, the source data graph identification information, and a timestamp associated with the query that initiated the generation of the reachability graph. The system may further record in the status data for the reachability graph that the reachability graph is currently in the process of being generated. Such an entry serves as an indication for later received queries with the same expression to denote that the reachability graph for the expression is currently being generated. With such an entry, the future queries' performance is improved because the duplicate generation of the same reachability graph is eliminated.

In an embodiment, the system initiates the generation of the reachability graph by traversing the target data graph and evaluating each edge to determine whether the edge qualifies for the expression. In a data graph with a root vertex, the system starts the traversal at the root node and traverses through each edge of the data graph to determine whether the edge qualifies for the expression of the reachability graph. If the edge qualifies for the expression, then the edge and the vertices that the edge connects are included in the reachability graph. In some embodiments, the attribute values of the edge and/or of the vertices are also recorded as part of the reachability graph. Alternatively, the edge and the vertices of the reachability graph are linked to the attributes stored for the corresponding edge and vertices of the data graph.

The evaluation of the expression may qualify multiple edges between a pair of vertices. A single edge representing the multiple qualified edges is recorded for the reachability graph, in an embodiment. In a directional data graph, the multiple qualified edges have to be in the same direction to be represented by the single edge in the reachability graph.

Various traversal techniques may be used for the traversal of the data graph such as breadth-first search and depth-first search. Regardless of the techniques used, the whole data graph is traversed in order to generate the corresponding reachability graph.

Although, such a full traversal of a data graph may be resource intensive, because the reachability graph may be re-used for many queries that contain the same expression for the same data graph, the techniques discussed herein significantly improve the execution time and resource consumption of those next queries. In fact, the costlier the expression for the reachability graph is, the more resource savings and performance improvement are achieved for the next execution of a query that contains the same expression.

At step 240, the generated reachability graph is stored in the repository's fast access memory along with the metadata of the reachability graph.

At step 250, the system evaluates the received query using the newly generated one or more reachability graphs. An execution plan for the query is generated for which the operations that are executed to evaluate the edge expression(s) of generated/matched reachability graphs are performed on the corresponding reachability graphs. Other operations may also be performed on the reachability graph such as evaluating predicates for selecting vertices or further filtering edges.

The query execution plan may include a mix of operations on the target data graph and the reachability graph. During such execution, at the point in the traversal, when the expression of the reachability graph is to be evaluated, the reachability graph is selected, and the system continues the traversal from the vertex of the reachability graph corresponding to the last traversed vertex in the data graph.

For example, continuing with the previous reachability query example "(x)→[YELLOW/(RED|BLUE)*]→(y)", for which a reachability graph is generated only for a portion of the edge expression, the "(RED|BLUE)*" unbounded sub-expression. Based on a sample query execution plan, operations for evaluation of the "(x)→YELLOW→(z)" expression may be executed on the target data graph rather than the reachability graph. Once the "(z)" vertices are determined from the data graph, the next operation(s) may use the reachability graph to evaluate the "(z)→(RED|BLUE)*→(y)" expression portion of the edge expression.

In an embodiment, in which query operations are evaluated on a reachability graph for an unbounded expression, less resource intensive algorithm may be used for the operations on the reachability graph. Because the unbounded expression has already been evaluated in the process of the generation of the reachability graph, the edges in the reachability graph have been determined to qualify for the unbounded expression. Accordingly, a traversal operation may be performed without any recursive operations. For example, for the shortest path determination operation, a breadth-first search or Dijkstra's algorithm may be used. This eliminates multiple traversals up-and-down the graph and improves the performance and resource utilization of the query execution.

At step 255, the system returns the result of the reachability query execution to the requesting client system. The result may include one or more paths (such as the shortest path that qualified for the query), attribute(s) of nodes and/or edges of the path(s), and/or an indication whether a path exists.

Re-Using Reachability Graphs

The reachability query executions may be further improved by re-using the reachability graphs stored in a repository. Continuing with FIG. 2, at step 215, a (sub-)expression of the received reachability query for the target data graph is searched in the repository's metadata of reachability graphs. To determine whether the repository includes a reachability graph for the (sub-)expression of the received query, the parsed (sub-)expression is compared with the expressions associated with the reachability graphs of the repository and stored in respective metadata.

For example, in response to receiving the following example reachability query discussed above "(x)→[YELLOW/(RED|BLUE)*]→(y)", the system searches for the parsed [YELLOW/(RED|BLUE)*], (RED|BLUE)* edge (sub-)expressions in metadata of repository.

If a corresponding reachability graph is identified in the repository, then the reachability graph from the repository is used rather than generating a new reachability graph. This re-use significantly improves the performance of the query and saves computational resources.

In some embodiment, even if the repository fails to contain the reachability graph that exactly matches a (sub-)expression of a received query, the (sub-)expression may still be evaluated using a reachability graph from the repository. If the (sub-)expression of the query selects a subset of edges of a reachability graph in the repository, then the reachability graph of the repository may be used for the execution of the query.

To determine whether a reachability graph has a super-set of the edges, the system compares the query expression with graph expressions of the repository. If the graph expression contains disjunctive sub-expressions, at least one of which is the same as the query expression, then the corresponding reachability graph is used to evaluate the query expression. For example, if the query expression is "RED*", and the reachability graph's expression is "(RED|BLUE)*", then the reachability graph can be used for traversal. In such a traversal, an additional step is performed to evaluate each traversed edge of the reachability graph to determine whether the edge represents a "RED" edge in the data graph.

Additionally or alternatively, if the query expression contains additional conjunctive sub-expression as compared with a reachability graph expression, then the reachability graph may be used. At each traversal of the reachability graph, additional evaluation is performed on each edge for the additional conjunctive sub-expression(s). For example, if the query expression is "[(RED|BLUE)&weight>40]*" and the reachability graph is for the "(RED|BLUE)*" expression is used. But at each edge traversal, the edge's "weight" attribute is evaluated to be greater than "40".

Concurrent Execution of Reachability Queries

In an embodiment, the system may receive two or more queries having the same (sub-)expression, in response to only one of which a reachability graph generation for the expression is initiated. In such an embodiment, continuing with FIG. 2, when, for the earliest received query, the system performs a lookup of the repository for the expression, the system determines that no reachability graph for the expression yet exists in the repository at step 215. At step 235, before the system initiates a generation of the reachability graph but after determining that sufficient memory exists for the reachability at step 230, the system records an entry for the to-be-generated reachability graph in the repository. The status data associated with the reachability graph entry may indicate that the generation of the reachability graph is in progress. The status data indicates the in-progress status until the reachability graph is generated, at which point the status data indicates the completion of the reachability graph.

When the next query with the same expression is received, the system performs a lookup for the expression in the repository at step 215. Since the previous query has caused an entry for the expression to be recorded, the system matches the entry at step 215 and retrieves the associated status data at step 220. If at step 220, the status data indicates that the reachability graph is in progress, rather than spending more computing resources to create another replica of a reachability graph for the execution, the system waits at step 220. The system may periodically query the status until the status data indicates that the reachability graph is completed and is ready for use. When the status data indicates that the reachability graph is completed, the system may request the reachability graph from the repository at step 245 and proceed to step 250 to evaluate the query using techniques described herein.

Software Overview

Figure 3:
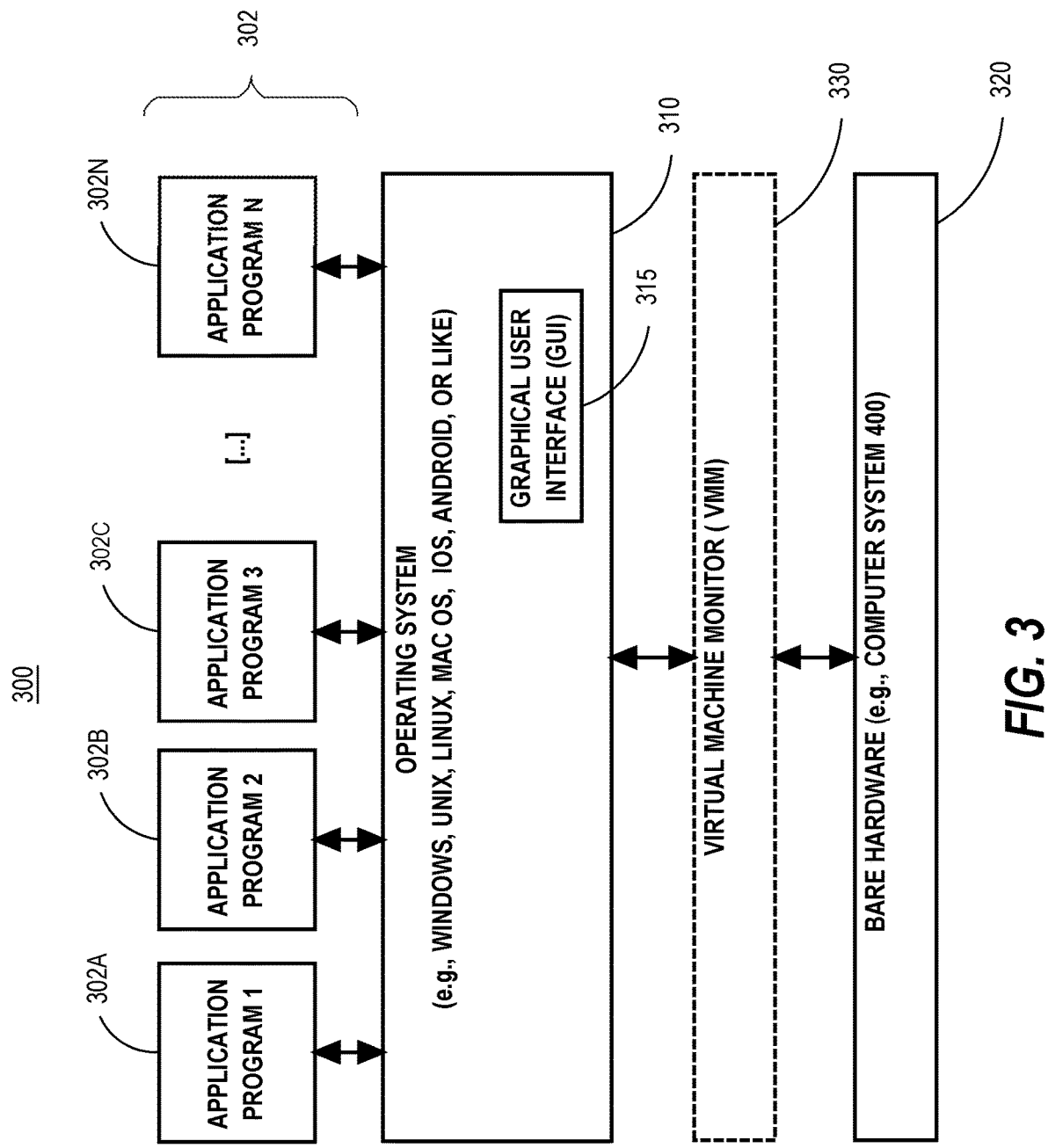
FIG. 3 is a block diagram of a basic software system, in one or more embodiments.
Figure 4:
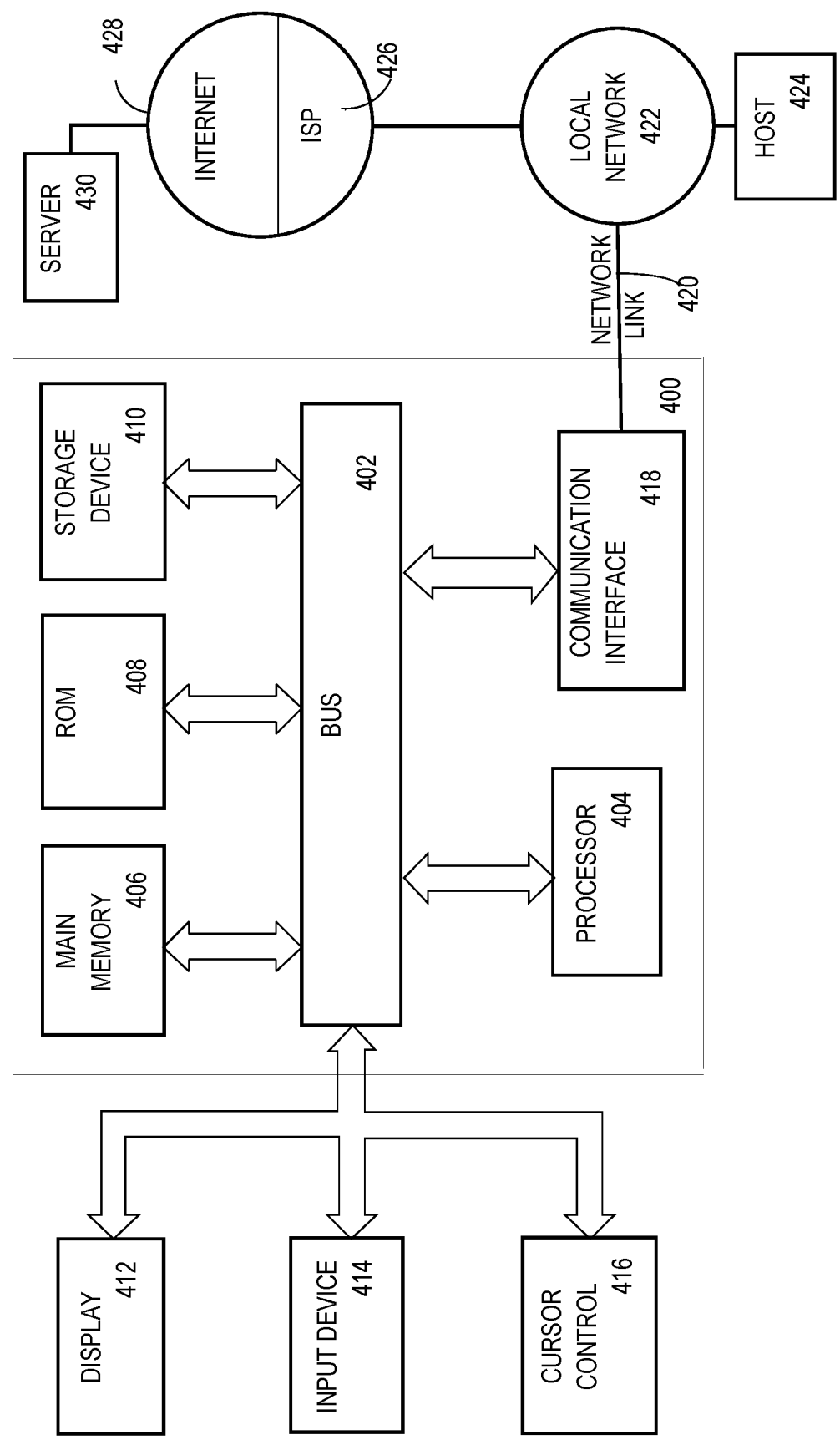
FIG. 4 is a block diagram that illustrates a computer system upon which an embodiment of the invention may be implemented.

FIG. 3 is a block diagram of a basic software system 300 that may be employed for controlling the operation of computing system 400 of FIG. 4. Software system 300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 300 is provided for directing the operation of computing system 400. Software system 300, which may be stored in system memory (RAM) 406 and on fixed storage (e.g., hard disk or flash memory) 410, includes a kernel or operating system (OS) 310.

The OS 310 manages low-level aspects of computer operation, including managing execution of processes, memory allocation, file input and output (I/O), and device I/O. One or more application programs represented as 302A, 302B, 302C . . . 302N, may be "loaded" (e.g., transferred from fixed storage 410 into memory 406) for execution by the system 300. The applications or other software intended for use on computer system 400 may also be stored as a set of downloadable computer-executable instructions, for example, for downloading and installation from an Internet location (e.g., a Web server, an app store, or another online service).

Software system 300 includes a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or application(s) 302. The GUI 315 also serves to display the results of operation from the OS 310 and application(s) 302, whereupon the user may supply additional inputs or terminate the session (e.g., log off).

OS 310 can execute directly on the bare hardware 320 (e.g., processor(s) 404) of computer system 400. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the computer system 400.

VMM 330 instantiates and runs one or more virtual machine instances ("guest machines"). Each guest machine comprises a "guest" operating system, such as OS 310, and one or more applications, such as application(s) 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of computer system 400 directly. In these instances, the same version of the guest operating system configured to execute on the bare hardware 320 directly may also execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or another communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or another dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal, and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426, in turn, provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Computing Nodes And Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

receiving a query for execution on a data graph, the query including one or more expressions for edges in the data graph, which when executed select one or more paths in the data graph to generate result data for the query;

determining whether, for the data graph, a particular reachability graph for a particular expression of the one or more expressions is stored in a repository, the particular reachability graph of the particular expression comprising reachability edges connecting reachability vertices;

wherein the particular reachability graph is generated by applying the particular expression to the data graph to qualify or disqualify one or more of the edges in the data graph from being included in the particular reachability graph;

wherein a reachability edge of the particular reachability graph exists between two reachability vertices, for which at least one edge of the data graph has been qualified between two vertices of the data graph by the two vertices of the data graph having correspondence to the two reachability vertices of the particular reachability graph;

based on determining that the particular reachability graph for the particular expression is stored in the repository, executing the query on the particular reachability graph without applying the particular expression on the data graph and generating the result data for the query.

2. The method of claim 1, further comprising, prior to receiving the query:

receiving another query for the data graph that includes the particular expression;

determining whether, for the data graph, the particular reachability graph of the particular expression is stored in the repository;

based on determining that the particular reachability graph for the particular expression is not stored in the repository, generating the particular reachability graph by applying the particular expression on the data graph to qualify or disqualify the one or more of the edges in the data graph;

storing the particular reachability graph in the repository.

3. The method of claim 1, further comprising, prior to receiving the query:

estimating a memory size of the particular reachability graph using data graph statistics;

based on the memory size and available amount of memory on which the repository is stored, determining whether the particular reachability graph can be stored in the repository;

based on determining that the particular reachability graph can be stored in the repository, generating the particular reachability graph.

4. The method of claim 3, wherein the particular expression includes one or more predicates, and the method further comprises:

for each of the one or more predicates, determining a selectivity probability of said each predicate based on the data graph statistics of the data graph;

aggregating selectivity probabilities of the one or more predicates to calculate an aggregate selectivity probability of the particular expression;

estimate the memory size of the particular reachability graph using the aggregate selectivity probability of the particular expression.

5. The method of claim 4, wherein aggregating selectivity probabilities of the one or more predicates comprises:

determining that a first predicate of the one or more predicates is disjunctively combined with a second predicate of the one or more predicates;

aggregating a first selectivity probability of the first predicate with a second selectivity probability of the second predicate by calculating the maximum selectivity probability of the first selectivity probability and the second selectivity probability.

6. The method of claim 4, wherein aggregating selectivity probabilities of the one or more predicates comprises:

determining that a first predicate of the one or more predicates is conjunctively combined with a second predicate of the one or more predicates;

aggregating a first selectivity probability of the first predicate with a second selectivity probability of the second predicate by calculating a product of the first selectivity probability and the second selectivity probability.

7. The method of claim 1, wherein determining whether, for the data graph, the particular reachability graph of the particular expression of the one or more expressions is stored in the repository comprises:

determining that the particular expression comprises of a first sub-expression and a second sub-expression;

determining that the first sub-expression is associated with the particular reachability graph of the repository;

executing the query on the particular reachability graph at least by applying the second sub-expression on the particular reachability graph.

8. The method of claim 1, wherein each of the reachability edges is associated with one or more attributes and attribute values of one or more corresponding edges of the data graph, and each of the reachability vertices is associated with one or more attributes and attribute values of one or more corresponding vertices of the data graph.

9. The method of claim 1, wherein the data graph comprises of vertices interconnected with the edges, each vertex of the vertices having one or more attributes describing a corresponding entity represented by said vertex, and each edge of the edges between two vertices of the vertices describes a relationship between two entities corresponding to said two vertices.

10. The method of claim 1, wherein the repository is stored on fast-access volatile memory.

11. The method of claim 1, further comprising selecting the particular expression from the one or more expressions of the query based on a criterion.

12. The method of claim 11, wherein the criterion is met for an unbounded expression.

13. The method of claim 1, wherein the repository includes a plurality of stored reachability graphs that include the particular reachability graph, and the method further comprising removing one or more reachability graphs from the repository based on access statistics of the repository to create available memory.

14. One or more non-transitory computer-readable media storing instructions, wherein the instructions include a sequence of instructions, which when executed by one or more hardware processors, causes:
   receiving a query for execution on a data graph, the query including one or more expressions for edges in the data graph, which when executed select one or more paths in the data graph to generate result data for the query;
   determining whether, for the data graph, a particular reachability graph for a particular expression of the one or more expressions is stored in a repository, the particular reachability graph of the particular expression comprising reachability edges connecting reachability vertices;
   wherein the particular reachability graph is generated by applying the particular expression to the data graph to qualify or disqualify one or more of the edges in the data graph from being included in the particular reachability graph;
   wherein a reachability edge of the particular reachability graph exists between two reachability vertices, for which at least one edge of the data graph has been qualified between two vertices of the data graph by the two vertices of the data graph having correspondence to the two reachability vertices of the particular reachability graph;
   based on determining that the particular reachability graph for the particular expression is stored in the repository, executing the query on the particular reachability graph without applying the particular expression on the data graph and generating the result data for the query.

15. The one or more non-transitory computer-readable media of claim 14, wherein the sequence of instructions further includes instructions, which, when executed by said one or more hardware processors, cause, prior to receiving the query:
   receiving another query for the data graph that includes the particular expression;
   determining whether, for the data graph, the particular reachability graph of the particular expression is stored in the repository;
   based on determining that the particular reachability graph for the particular expression is not stored in the repository, generating the particular reachability graph by applying the particular expression on the data graph to qualify or disqualify the one or more of the edges in the data graph;
   storing the particular reachability graph in the repository.

16. The one or more non-transitory computer-readable media of claim 14, wherein the sequence of instructions further includes instructions, which, when executed by said one or more hardware processors, cause, prior to receiving the query:
   estimating a memory size of the particular reachability graph using data graph statistics;
   based on the memory size and available amount of memory on which the repository is stored, determining whether the particular reachability graph can be stored in the repository;
   based on determining that the particular reachability graph can be stored in the repository, generating the particular reachability graph.

17. The one or more non-transitory computer-readable media of claim 16, wherein the particular expression includes one or more predicates, and wherein the sequence of instructions further includes instructions, which, when executed by said one or more hardware processors, cause:
   for each of the one or more predicates, determining a selectivity probability of said each predicate based on the data graph statistics of the data graph;
   aggregating selectivity probabilities of the one or more predicates to calculate an aggregate selectivity probability of the particular expression;
   estimate the memory size of the particular reachability graph using the aggregate selectivity probability of the particular expression.

18. The one or more non-transitory computer-readable media of claim 17, wherein the sequence of instructions further includes instructions, which, when executed by said one or more hardware processors, cause:
   determining that a first predicate of the one or more predicates is disjunctively combined with a second predicate of the one or more predicates;
   aggregating a first selectivity probability of the first predicate with a second selectivity probability of the second predicate by calculating the maximum selectivity probability of the first selectivity probability and the second selectivity probability.

19. The one or more non-transitory computer-readable media of claim 17, wherein the sequence of instructions further includes instructions, which, when executed by said one or more hardware processors, cause:
   determining that a first predicate of the one or more predicates is conjunctively combined with a second predicate of the one or more predicates;
   aggregating a first selectivity probability of the first predicate with a second selectivity probability of the second predicate by calculating a product of the first selectivity probability and the second selectivity probability.

20. The one or more non-transitory computer-readable media of claim 14, wherein the sequence of instructions further includes instructions, which, when executed by said one or more hardware processors, cause:
   determining that the particular expression comprises of a first sub-expression and a second sub-expression;
   determining that the first sub-expression is associated with the particular reachability graph of the repository;
   executing the query on the particular reachability graph at least by applying the second sub-expression on the particular reachability graph.

21. The one or more non-transitory computer-readable media of claim 14, wherein each of the reachability edges is associated with one or more attributes and attribute values of one or more corresponding edges of the data graph, and each of the reachability vertices is associated with one or more attributes and attribute values of one or more corresponding vertices of the data graph.

22. The one or more non-transitory computer-readable media of claim 14, wherein the data graph comprises of vertices interconnected with the edges, each vertex of the vertices having one or more attributes describing a corresponding entity represented by said vertex, and each edge of the edges between two vertices of the vertices describes a relationship between two entities corresponding to said two vertices.

23. The one or more non-transitory computer-readable media of claim 14, wherein the repository is stored on fast-access volatile memory.

24. The one or more non-transitory computer-readable media of claim 14, wherein the sequence of instructions further includes instructions, which, when executed by said one or more hardware processors, cause selecting the particular expression from the one or more expressions of the query based on a criterion.

25. The one or more non-transitory computer-readable media of claim 24, wherein the criterion is met for an unbounded expression.

26. The one or more non-transitory computer-readable media of claim 14, wherein the repository includes a plurality of stored reachability graphs that include the particular reachability graph, and wherein the sequence of instructions further includes instructions, which, when executed by said one or more hardware processors, cause removing one or more reachability graphs from the repository based on access statistics of the repository to create available memory.

* * * * *